United States Patent
Khan et al.

(10) Patent No.: US 6,924,045 B2
(45) Date of Patent: Aug. 2, 2005

(54) BOND OR OVERLAY MCRAIY-COATING

(75) Inventors: Abdus S. Khan, Ennetbaden (CH);
Maxime Konter, Klingnau (CH);
Robert Schmees, Wellington, FL (US)

(73) Assignee: ALSTOM Technology LTD, Baden (CH)

( * ) Notice: Subject to any disclaimer, the term of this patent is extended or adjusted under 35 U.S.C. 154(b) by 139 days.

(21) Appl. No.: 10/137,343

(22) Filed: May 3, 2002

(65) Prior Publication Data

US 2002/0187336 A1 Dec. 12, 2002

(30) Foreign Application Priority Data

May 25, 2001 (EP) .............................................. 01112647
Jan. 10, 2002 (EP) .............................................. 02405010

(51) Int. Cl.[7] ........................ B32B 15/00; B32B 15/04; B32B 15/20; F01D 5/14; B63H 7/02
(52) U.S. Cl. ...................... 428/678; 428/666; 428/650; 428/651; 428/680; 428/681; 428/679; 428/655; 416/241 R; 416/229 R
(58) Field of Search ...................... 425/678; 416/241 A, 416/229 R, 241 R; 428/666, 667, 650, 651, 680, 679, 655, 681

(56) References Cited

U.S. PATENT DOCUMENTS

| | | | |
|---|---|---|---|
| 3,528,861 A | 9/1970 | Elam et al. ................. | 148/11.5 |
| 3,676,085 A | 7/1972 | Evans et al. .................. | 29/194 |
| 3,754,903 A | 8/1973 | Goward et al. ................ | 75/171 |
| 4,055,705 A | 10/1977 | Stecura et al. ............... | 428/633 |
| 4,152,223 A | 5/1979 | Wallace et al. ............. | 204/37 R |
| 4,248,940 A | 2/1981 | Goward et al. ............. | 428/633 |
| 4,313,760 A | 2/1982 | Dardi et al. ................ | 106/1.12 |
| 4,321,311 A | 3/1982 | Strangman .................. | 428/623 |
| 4,346,137 A | 8/1982 | Hecht ......................... | 428/215 |
| 4,419,416 A | 12/1983 | Gupta et al. ................ | 428/656 |
| RE32,121 E | 4/1986 | Gupta et al. ................ | 428/656 |
| 4,585,481 A | 4/1986 | Gupta et al. ............. | 106/14.05 |
| 4,676,994 A | 6/1987 | Demaray .................... | 427/42 |
| 4,743,514 A | 5/1988 | Strangman et al. ......... | 428/678 |
| 4,973,445 A | 11/1990 | Singheiser .................. | 420/443 |
| 6,001,492 A * | 12/1999 | Jackson et al. ............. | 428/610 |
| 6,221,181 B1 * | 4/2001 | Bossmann et al. .......... | 148/428 |
| 6,306,515 B1 * | 10/2001 | Goedjen et al. ............. | 428/469 |
| 6,372,299 B1 * | 4/2002 | Thompson et al. ......... | 427/456 |
| 6,454,992 B1 * | 9/2002 | Hebsur ......................... | 419/32 |
| 2002/0004142 A1 * | 1/2002 | Ritter et al. ................ | 428/609 |
| 2002/0090527 A1 * | 7/2002 | Thompson et al. ......... | 428/553 |
| 2003/0054196 A1 * | 3/2003 | Lau et al. .................... | 428/655 |

FOREIGN PATENT DOCUMENTS

EP 1061150 A2 12/2000

OTHER PUBLICATIONS

Database INSPEC, Institute of Electrical Engineers, Stevenage, GB; Gudmundsson B. et al, "Structure formation and interdiffusion in vacuum plasma sprayed CoNiCrAlY coatings on IN7381C", Database accession no. 3204625, XP002181289 abstract, 1988, (no month).

Database INSPEC, Institute of Electrical Engineers, Stevenage, GB; Gudmundsson B. et al, "Structure formation and interdiffusion in vacuum plasma sprayed CoNiCrAlY coatings on IN7381C", Database accession no. 3204625, XP002181289 abstract, (no date).

Toma D et al, "Studies on the transient stage of oxidation of VPS and HVOF sprayedmcraly coatings", Surface and Coatings Technology, Elsevier, Amsterdam, NL, vol. 120/121, 1999, pp. 8–15, XP001004808, (no month).

* cited by examiner

Primary Examiner—Michael La Villa
(74) Attorney, Agent, or Firm—Cermak & Kenealy LLP; Adam J. Cermak

(57) ABSTRACT

It is disclosed a bond or overlay MCrAlY-coating for the use within a high temperature environment for the protection of the base alloy of turbine blades and vanes. The MCrAlY-coating having a γ or γ/γ'-structure comprises a dispersion of β-NiAl and/or γ/β-MCrAlY particles. This provides a reservoir of aluminum reservoir to coatings wherein the reservoir replenish the aluminum lost due to oxidation and interdiffusion during service. The β-NiAl and/or γ/β-MCrAlY is the aluminum reservoir and is applied by mixing appropriate powders with γ or γ/γ' powders.

12 Claims, No Drawings

BOND OR OVERLAY MCRAIY-COATING

FIELD OF INVENTION

The invention relates to a bond or overlay MCrAlY-coating according to the preamble of claim 1.

STATE OF THE ART

Components designed for the use in the area of high temperature, e.g. blades or vanes of a gas turbine, are usually coated with resistant coatings. The coating protects the base material against corrosion and oxidation due to the thermal effect of the hot environment and consists of an alloy mostly using the elements Al and Cr. Most turbine components are coated for protection from oxidation and/or corrosion with, for example, a MCrAlY coating (base coat) and some are also coated with a thermal barrier coating (TBC) for thermal insulation. MCrAlY protective overlay coatings are widely known in the prior art. They are a family of high temperature coatings, wherein M is selected from one or a combination of iron, nickel and cobalt. As an example U.S. Pat. No. 3,528,861 or U.S. Pat. No. 4,585,418 are disclosing such kind of oxidation resistant coatings. U.S. Pat. No. 4,152,223 as well discloses such method of coating and the coating itself. Besides the $\gamma/\beta$-MCrAlY-coating, there is another class of over-lay MCrAlY coatings which are based on a $\gamma/\gamma'$-gamma/gamma prime-structure. The advantages of $\gamma/\gamma'$-coatings is that they have a negligible thermal expansion mismatch with alloy of the underlying turbine article. For higher thermal fatigue resistance the $\gamma/\gamma'$-coating are more convenient compared to the $\gamma/\beta$-type of MCrAlY-coatings. A higher thermal fatigue resistance in coatings is most desirable since failure of the most turbine blades and vanes at elevated temperature is typically thermal fatigue driven.

Among $\gamma/\gamma'$-coatings and $\gamma/\beta$-coatings, the field of $\gamma/\beta$-coatings have been an active area of research and a series of patents has been issued. E.g. a Ni-CrAlY coating is described in U.S. Pat. No. 3,754,903 and a CoCrAlY coating in U.S. Pat. No. 3,676,058. U.S. Pat. No. 4,346,137 disclose an improved high temperature fatigue resistance NiCoCrAlY coating. U.S. Pat. Nos. 4,419,416, 4,585,481, RE-32,121 and U.S. Pat. No. 4,743,514 describe MCrAlY coatings containing Si and Hf. U.S. Pat. No. 4,313,760 discloses a superalloy coating composition with good oxidation, corrosion and fatigue resistance.

In contrast to the $\gamma/\beta$-coatings, the $\gamma/\gamma'$-type of MCrAlY coatings, known e.g. from U.S. Pat. No. 4,973,445, are relatively new. The unique feature of this type of $\gamma/\gamma'$-coatings is that their thermal expansion mismatch is close to zero in combination with a high ductility, what make these coatings more resistant to thermal fatigue. However the limitations are the low aluminum content and hence their low reservoir of aluminum.

Furthermore, in the state of the art Thermal-Barrier-Coatings (TBC) are known from different patents. U.S. Pat. Nos. 4,055,705, 4,248,940, 4,321,311 or 4,676,994 disclose a TBC-coating for the use in the turbine blades and vanes. The ceramics used are yttria stabilized zirconia and applied by plasma spray (U.S. Pat. Nos. 4,055,705, 4,248,940) or by electron beam process (U.S. Pat. Nos. 4,321,311, 4,676,994) on top of the MCrAlY bond coat.

SUMMARY OF THE INVENTION

It is object of the present invention to replenish the loss of aluminum by oxidation and interdiffusion in service due to long term exposure at elevated temperatures of a bond or overlay MCrAlY-coating having a $\gamma$- or $\gamma/\gamma'$-structure. Another object is to provide a durable coating for industrial and aircraft gas turbine engines.

According to the invention a bond or overlay MCrAlY-coating of an article was found, the coating having a $\gamma$- or $\gamma/\gamma'$-structure, the article used in a high temperature environment, wherein the MCrAlY-coating comprises a dispersion of $\beta$-NiAl and/or $\gamma/\beta$-MCrAlY particles.

The present invention provides an aluminum $\beta$-NiAl and/or $\gamma/\beta$-MCrAlY reservoir to a $\gamma$- or $\gamma/\gamma'$ alloy matrix by a dispersion of $\beta$-NiAl and/or $\gamma/\beta$-MCrAlY particles. The $\beta$-NiAl and/or $\gamma/\beta$-MCrAlY particles are applied by mixing a NiAl powder with a $\gamma$- or $\gamma/\gamma'$ powder.

The powder size of the $\beta$-NiAl and/or $\gamma/\beta$-MCrAlY particles for the mentioned broad range is from 5 to 150 $\mu$m, but is preferably between of 20 to 75 $\mu$m. The volume fraction of $\beta$-NiAl and/or $\gamma/\beta$-MCrAlY can be (vol.-%) 0.01 to 40%, preferably 0.01 to 25% and most preferably (vol.-%) 0.01–5%.

Preferably, the coating comprises at least one layer of a $\gamma$- or $\gamma/\gamma'$-structure containing the dispersed of $\beta$-NiAl and/or $\gamma/\beta$-MCrAlY particles. This could be in alternating layers with and without the dispersed of $\beta$-NiAl and/or $\gamma/\beta$-MCrAlY particles or as a first layer on top of the gas turbine article and a layer on top of the coating. The dispersed $\beta$-NiAl particles will include (wt.-%) 20–33% Al and the $\gamma/\beta$-MCrAlY particles will include (wt.-%) 8 to 17% Al. Both can comprise one or a combination of Y, Hf, Zr, Si, Ca, Mg, Fe and Ta.

The coating can be applied by a galvanic or plasma spray or any other conventional method used for deposition of overlay and bond coatings.

DETAILED DESCRIPTION OF INVENTION

It is disclosed a bond or overlay MCrAlY-coating for the use within a high temperature environment for the protection of the base alloy such as turbine blades or vanes. The MCrAlY-coating having a $\gamma/\gamma'$-structure comprises a dispersion of $\beta$-NiAl and/or $\gamma/\beta$-MCrAlY particles. This provides an reservoir of aluminum reservoir to coatings wherein the reservoir replenish the aluminum lost due to oxidation and interdiffusion during service of the article. The $\beta$-NiAl and/or $\gamma/\beta$-MCrAlY is the aluminum reservoir and is applied by mixing NiAl and/or $\gamma/\beta$-MCrAlY powders with a $\gamma$- or $\gamma/\gamma'$ powders.

The technical goal is to retain the ductility of the $\gamma/\gamma'$ structure, and accrue the benefit of high aluminum containing dispersoid $\beta$-NiAl and/or $\gamma/\beta$-MCrAlY which will provide sufficient Al to allow and retain formation of alumina scale. It is to be noted that due to higher ductility the $\gamma/\gamma'$ matrix will accommodate the stresses generated during thermal mechanical loading of the component in service.

The bond or overlay MCrAlY-coating could consist of (wt.-%) 5–30% Cr and 3–6% Al, balance Ni, Fe or Co individually or in combination thereof, e.g. Ni-25Cr-3Al, Ni-25Cr-5Al or Ni-28Cr-6Al. The composition of the $\gamma$ matrix is controlled by the phase diagram of nickel-chromium-aluminum ternary. The Ni, Cr, Al content of the MCrAlY is adjusted to allow the formation of stable $\gamma/\gamma'$ microstructure.

Furthermore, the coating can comprise W, Re, Ru and Ta individually or in combination thereof. In addition, the coating could comprise one or a combination of Y, Hf, Zr and Si with (wt-%) 0.1–5% Y+Hf+Zr+Si and one or a combination of Ta, Fe, Ga, Mg and Ca. A content according to this embodiment is (wt-%) 0.001–0.5% Y, 0–0.5% Zr, 0.1–1.5% Si, 0–1.0% Ca, 0–1.0% Mg, 0–4% Ga, 0–4% Fe, 0.1–4.0% Ta.

Examples (wt-%) for the coating compositions according to the invention are given in table 1 below.

TABLE 1

| Example | Ni | Co | Cr | Al | Hf | Y | Ta | Si | β-NiAl and/or γ/β-MCrAlY (vol.-%) |
|---------|-----|-----|-----|-----|-----|------|-----|-----|-----|
| I | Bal. | — | 25 | 5 | 0.5 | 0.2 | — | — | 5 |
| II | Bal. | 28 | 12 | 7 | — | 0.05 | 0.5 | 1.2 | 2 |
| III | Bal. | 25 | 25 | 6 | 0.5 | 0.2 | — | — | 10 |
| IV | Bal. | — | 12 | 7 | — | 0.3 | — | — | 20 |
| V | Bal. | 25 | 25 | 5 | — | 0.3 | — | 1.2 | 15 |
| VI | Bal. | — | 25 | 5 | 0.5 | 0.2 | — | — | 1 |
| VII | Bal. | — | 17 | 5 | 0.5 | 0.2 | — | — | 5 |
| VIII | Bal. | — | 25 | 5 | 0.5 | 0.2 | — | — | 0.5 |

The volume fraction of β-NiAl and/or γ/β-MCrAlY particles could be between (vol.-%) 0.01 to 40%. A preferred range is between (vol.-%) 0.01 and 25%, a most preferred range is between (vol.-%) 0.01 and 5%. The powder size of the β-NiAl and/or γ/β-MCrAlY is within the broad range up to 125 μm, but generally limited to 20 to 75 μm.

This invention provides lifetime benefits by retaining the alumina forming capability of the coating due to β-NiAl and/or γ/β-MCrAlY particulate dispersion in the coating matrix as typical for γ/β-MCrAlY coatings.

The dispersed β-NiAl particles can include (wt.-%) 20–33% Al and the γ/β-MCrAlY particles will include (wt.-%) 8 to 17% Al. Both can comprise and one or a combination of Y, Hf, Zr, Si, Ca, Mg, Fe and Ta, which increases the oxidation resistance further. As an example the β-NiAl and/or γ/β-MCrAlY particles can comprise (wt-%) 0.001–0.5% Y, 0.001–0.5% Zr, 0.1–1.5% Si, 0–1.0% Ca, 0–1.0% Mg, 0–4% Ga, 0–4% Fe, 0.1–4.0% Ta.

Preferably, the coating comprises at least one layer of a γ- or γ/γ'-structure containing the dispersed of β-NiAl and/or γ/β-MCrAlY particles. This could be in alternating layers with and without the dispersed of β-NiAl and/or γ/β-MCrAlY particles. This could be as well as a first layer on top of the gas turbine article and a layer on the outer surface of the coating.

The coating can be applied by a galvanic or plasma spray or any other conventional method used for deposition of overlay and bond coatings.

What is claimed is:

1. A bond or overlay MCrAlY-coating on the surface of an article, the MCrAlY-coating having a γ- or γ/γ'-structure, wherein the MCrAlY-coating comprises a dispersion of β-NiAl and/or γ/β-MCrAlY particles, and wherein the dispersed particles comprise γ/β-MCrAlY particles including (wt.-%) 8% to 17% Al.

2. The bond or overlay MCrAlY-coating according to claim 1, comprising a size of the β-NiAl and/or γ/β-MCrAlY particles from 5 to 150 μm.

3. The bond or overlay MCrAlY-coating according to claim 2, comprising a size of the β-NiAl and/or γ/β-MCrAlY particles of 20 to 75 μm.

4. The bond or overlay MCrAlY-coating according to claim 1, wherein the coating comprises at least one layer of a γ- or γ/γ'-structure containing the dispersed β-NiAl and/or γ/β-MCrAlY particles.

5. The bond or overlay MCrAlY-coating according to claim 4, wherein said at least one layer comprises a plurality of layers, and wherein the coating consists of said plurality of layers alternating with and without said dispersed particles.

6. The bond or overlay MCrAlY-coating according to claim 4, wherein said at least one layer comprises a lowermost layer immediately adjacent to the article and an uppermost layer spaced from the article, wherein each of said lowermost and uppermost layers comprises the γ- or γ/γ'-structure with the dispersed β-NiAl and/or γ/β-MCrAlY particles.

7. The bond or overlay MCrAlY-coating according to claim 1, comprising a volume fraction of (vol.-%) 0.01 to 40% β-NiAl and/or γ/β-MCrAlY.

8. The bond or overlay MCrAlY-coating according to claim 7, comprising a volume fraction of (vol.-%) 0.01 to 25% β-NiAl and/or γ/β-MCrAlY.

9. The bond or overlay MCrAlY-coating according to claim 8, comprising a volume fraction of (vol.-%) 0.01 to 5% β-NiAl and/or γ/β-MCrAlY.

10. The bond or overlay MCrAlY-coating according to claim 1, wherein the dispersed particles comprise β-NiAl particles including (wt.-%) 20–33% Al.

11. The bond or overlay MCrAlY-coating according to claim 1, wherein the dispersed β-NiAl and/or γ/β-MCrAlY particles contain one or a combination of Y, Hf, Zr, Si, Ca, Mg, Fe, and Ta.

12. The bond or overlay MCrAlY-coating according to claim 1, wherein the MCrAlY-coating is deposited by a method selected from the group consisting of galvanic spraying and plasma spraying.

* * * * *